July 10, 1928.
E. N. FALES ET AL
1,676,984
MEANS FOR VISUALIZING AIR FLOW PHENOMENA
Filed Dec. 3, 1920
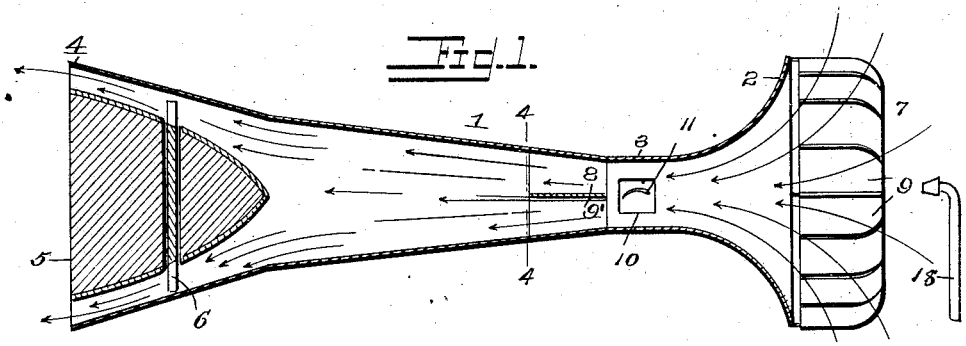
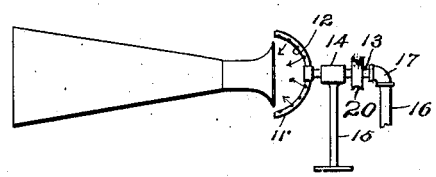
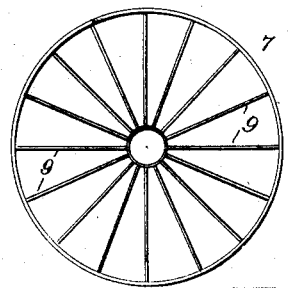
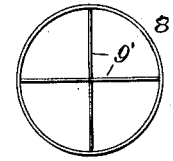
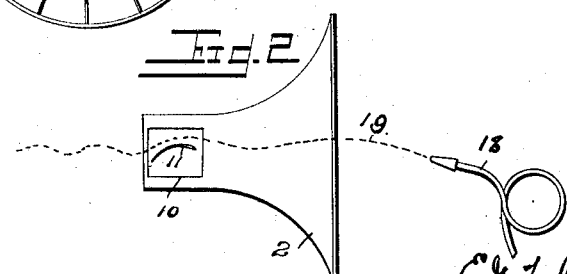
Inventor
E. N. Fales
F. W. Caldwell
By Robert H. Young
Attorney Patented July 10, 1928.

1,676,984

UNITED STATES PATENT OFFICE.

ELISHA N. FALES, OF DAYTON, OHIO, AND FRANK W. CALDWELL, OF LOOKOUT MOUNTAIN, TENNESSEE.

MEANS FOR VISUALIZING AIR-FLOW PHENOMENA.

Application filed December 3, 1920. Serial No. 428,165.

This invention relates to means for visualizing air phenomena. For the purposes of aeronautics, ventilation, and the like it is desirable to know exactly what is happening in the stream of air. In the past, attempts have been made to indicate the action of the air against various surfaces such as aerofoils by letting loose small jets of smoke, dust, colored gas, and the like or by using little threads as weather vanes or by studying the static pressure distribution in the air passing through a wind tunnel for example. The invention contemplated herein and hereinafter particularly described principally enables the observer to see the air, so to speak, and carefully observe the action of the air against such surfaces.

When air is cooled sufficiently, the water vapor normally present therein will be condensed and will have an appearance similar to steam. Condensation of this water vapor will occur due to various contributing causes such as particles of dust, solid objects or electrical charges. Condensation is facilitated by such nuclei. In order to have visible air it is then necessary to increase the relative humidity to approximately 100% at the place where the observation is being made. This may be, as above indicated, by cooling or expanding the air or by increasing the moisture content thereof. In the device principally referred to in this invention, the air is cooled in accordance with the following method. If atmospheric air is led into a tube or tunnel along the length of which the diameter decreases to a minimum value, and then increases again, we have in effect what is called a Venturi tube. This tube has the quality of speeding up the air flow in the constricted throat of minimum diameter without expenditure of motor energy equal to the kinetic energy in the throat. During the flow through the tube, however produced, the air in speeding up drops its pressure suddenly, accompanied by a drop in temperature and if this effect is sufficiently intensified by means of the requisite velocity the temperature will drop sufficiently to cause dew formation or fog in the chilled part of the stream. Objects, surfaces, whirls, or electrical effects act as nuclei to start condensation of moisture in this high speed flow. The moisture, condensing instantaneously, becomes visible and since the nucleus, which has caused the condensation, acts only locally it will be found that the intensity of condensation varies at different points in the moving air stream. Moreover the motion of the air, where non-rectilinear, involves centrifugal forces and changes of pressure which tend to act on the condensed moisture particles in such a way as to cause a varying light intensity in the appearance of the fog formation. In case of regular whirls, as vortices, the pressure drop due to the vortex is accompanied by an exaggerated degree of cold and visibility is particularly pronounced.

In the accompanying drawings;

Figure 1 is a longitudinal section through a wind tunnel of such character as to enable the present invention to be carried out;

Figure 2 is a fragmentary section of a modified form of my device showing the intake end of the tunnel and the means for supplying steam jets to the inflowing air;

Figure 3 is an elevation of the intake end of the wind tunnel showing the means for straightening out the air stream;

Figure 4 is a section on the line 4—4 of Figure 1, slightly enlarged, showing other air straightening means used in conjunction with the means shown in Figure 3; and Figure 5 is a diagrammatic view showing the use of another form of steam supply.

One embodiment of the invention is clearly illustrated in the accompanying drawings in which 1 designates the body of a wind tunnel of any suitable length and diameter. The receiving or intake end of the tunnel is greatly enlarged and flared to form a bell-shaped inlet mouth 2 preferably having radius of curvature of one and five eighths times the diameter of the constricted throat or portion of smallest diameter as indicated at 3. Furthermore the length of the throat portion 3 need not exceed twice its own diameter.

At the end of the tunnel opposite the intake bell or throat 2 the tunnel is enlarged and flared as shown at 4 and arranged therein is a core 5 which contains a suction fan 6 situated between fore and aft portions of expanding cone as illustrated in Figure 1. The fan consists of any suitable number of blades, preferably a large number of blades, and it will be noted that the hub portion of the fan is entirely blanked so that the blades are comparatively far from the axis and act on the air stream in a manner similar to a steam turbine rotor. The blades are quite close together so as to obtain the best relation between the tip speed and air flow speed. The discharge from this fan is caught by the expanding cone and passes outwardly through the bell shaped passageway.

The efficiency of the tunnel is further increased by a novel arrangement of straighteners, one of such straighteners being indicated at 7 and located at the intake end of the tunnel while another straightener 8 is arranged at the opposite side of the throat 3. Each of the straighteners comprises a plurality of blades 9 and 9' and these blades are radially disposed with respect to the longitudinal axis of the wind tunnel. In other words the blades 9 and 9' are arranged in a manner similar to the spokes of a wheel and they serve to minimize the turbulence of the air passing through the throat preventing the same from taking up a helical motion. Vanes arranged in the manner above described have the advantage over the honeycomb arrangement, usually disposed in the highest velocity of the air flow, in that they cause less resistance to the air flow.

The wind tunnel hereinbefore described may be provided with a transparent observation window 10 at one side of the constricted throat 3 so that an aerofoil 11 or any other object, when placed in the throat 3, may be observed or rather the action of the visible air on said object may be observed. The object 11 may be inserted through such window or opening in the side of the throat 3 or it may be introduced through the intake throat of the tunnel. When in place, it constitutes nucleus, and under proper conditions of moisture and temperature a fog formation will be produced in the throat 3, rendering the air visible so that the action thereof on the aerofoil or other object 11 may be observed and accurate deductions made. Steam or condensed moisture may introduced into the air stream for rendering the air visible by the means shown in Fig. 5, for example. The means illustrated comprises a substantially semi-circular or arcuate steam distributing pipe 11' having steam outlets or jet openings 12 arranged at intervals in the concaved side thereof, the pipe 11' embracing or extending around the intake end of the wind tunnel and partially embracing the straightener member 7. The pipe 11' is carried by and fast upon one end of a tubular shaft 13 mounted in a bearing 14 on a supporting standard 15. The shaft 13 may be driven by any suitable means for example, through pulley 20, steam being led thereto by means of a steam supply pipe 16 having a swivel connection with the shaft 13 by means of an elbow 17. By the means described, steam will reach every part of the air stream. Instead of employing the curved steam distributing pipe 11' the steam may be delivered in a single larger jet by means of a steam supply pipe 18 having a single outlet or discharge as shown in Figure 2, causing the steam to flow in ribbon like formation as indicated at 19. By changing the position of the discharge end of the steam supply pipe 18, the steam jet may be delivered above or below or in any other desired relation to the aerofoil or object 11 to enable the proper observations to be made and to visualize the effect of the air stream on such object.

We claim:

1. A wind tunnel embodying a tapered portion which contracts in a down stream direction, and another tapered portion which expands in a downstream direction, wind generating means in the tunnel on one side of the most constricted portion thereof, and air stream straightening means on each side of said constricted portion.

2. A wind tunnel having a portion between the ends thereof constricted to cause acceleration of the wind passing therethrough, wind generating means in said tunnel on one side of said constricted portion, and means for introducing steam into the inlet end of the tunnel.

3. A wind tunnel having a portion between the ends thereof constricted to cause acceleration of the wind passing therethrough, wind generating means in said tunnel on one side of said constricted portion, and rotary spray-injecting means to admit steam into the upstream portion of the tunnel.

4. A wind tunnel having a Venturi-shaped portion constricted to cause acceleration of the wind passing therethrough, wind generating means for said tunnel on one side of said constricted portion, and humidifying means for the air passing through the constricted portion.

5. A wind tunnel embodying a tapered portion which contracts in a down-stream direction, and another tapered portion which expands in a down-stream direction, wind generating means in the tunnel on one side of the most constricted portion thereof, air-stream straightening means on one side of the constricted portion, an observation window at the constricted portion and humidifying means for the air passing through the constricted portion.

6. A wind tunnel embodying a tapered portion which contracts in a down-stream direction and another tapered portion which expands in a downstream direction, wind generating means in the tunnel on one side of the most constricted portion thereof, airstream straightening means on one side of the constricted portion, said wind-generating means comprising a forwardly tapering cone and rotatable fan blades projecting from the sides of the cone so that the blades engage the air at points remote from the central axis of the same.

In testimony whereof we have affixed our signatures.

ELISHA N. FALES.
FRANK W. CALDWELL.